United States Patent [19]

Bernard et al.

[11] Patent Number: 5,143,604
[45] Date of Patent: * Sep. 1, 1992

[54] ONE-WAY GUIDED FILTER PAD ASSEMBLY

[75] Inventors: Richard A. Bernard, Kirkland; John G. Gardner, Woodinville, both of Wash.

[73] Assignee: Filtercorp, Inc., Woodinville, Wash.

[*] Notice: The portion of the term of this patent subsequent to Dec. 24, 2008 has been disclaimed.

[21] Appl. No.: 695,580

[22] Filed: May 3, 1991

Related U.S. Application Data

[63] Continuation-in-part of Ser. No. 527,566, May 22, 1990, Pat. No. 5,075,000.

[51] Int. Cl.⁵ .............................................. B01D 46/10
[52] U.S. Cl. .................................... 210/168; 210/416.5; 210/445; 210/484; 210/495; 55/493; 55/DIG. 31
[58] Field of Search ................. 210/168, 416.5, 445, 210/484, 495, 449, 232, 238, 453, 485; 55/493, DIG. 31, 511, 510, 505

[56] References Cited

U.S. PATENT DOCUMENTS

| | | | |
|---|---|---|---|
| 3,280,984 | 10/1966 | Sexton et al. | 55/493 |
| 3,348,044 | 10/1967 | Sanders | 55/493 |
| 3,929,648 | 12/1975 | Cuthbert | 210/453 |
| 4,549,887 | 10/1985 | Joannou | 55/493 |
| 4,762,053 | 8/1988 | Walfert | 55/493 |
| 4,801,316 | 1/1989 | Schroeder | 55/DIG. 31 |
| 4,828,694 | 5/1989 | Leason | 210/168 |
| 4,999,038 | 3/1991 | Lundberg | 55/511 |
| 5,049,274 | 9/1991 | Leason et al. | 55/511 |

*Primary Examiner*—Robert A. Dawson
*Assistant Examiner*—W. L. Millard
*Attorney, Agent, or Firm*—Christenson, O'Connor, Johnson & Kindness

[57] ABSTRACT

An improved filter pad assembly, for supporting a filter pad, used in conjunction with a filter system having a pumping unit to filter a contaminated fluid. Included in the filter pad assembly are a filter pad support member, a sealing member, and securing means for maintaining the filter pad support member and sealing member in a closed operative position during the filtering process such that a substantially fluid-tight seal is created therebetween. Thus, the contaminated fluid is prevented from exiting the filter pad assembly without passing through the filter pad. The filter pad assembly may be defined to include, or not include, the filter pad. The filter pad assembly and filter pad also have a one-way guided configuration that ensures the filter pad is properly oriented within the assembly. Three preferred embodiments of the filter pad assembly of the present invention are disclosed.

30 Claims, 9 Drawing Sheets

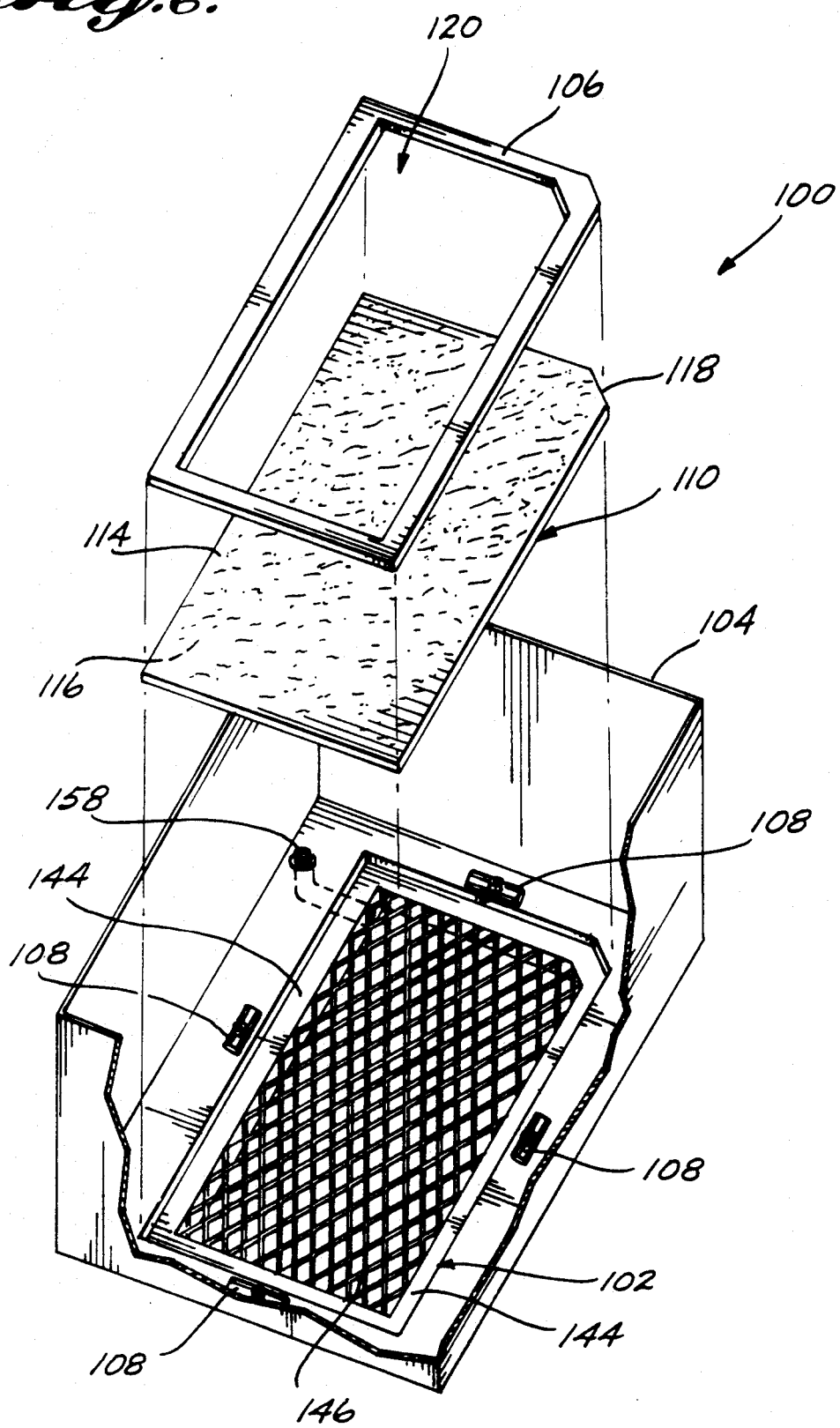

ONE-WAY GUIDED FILTER PAD ASSEMBLY

RELATED APPLICATION

This application is a continuation-in-part of prior application Ser. No. 527,566 filed May 22, 1990, which is now U.S. Pat. No. 5,075,000, the benefit of the filing date of which is hereby claimed under 35 U.S.C. § 120.

TECHNICAL FIELD

This invention relates to filter assemblies and, more specifically, to filter assemblies particularly useful in supporting a filter pad used to filter hot cooking oil.

BACKGROUND OF THE INVENTION

Cooking oils, such as those used in commercial or institutional deep fryers, tend to become contaminated with such things as moisture and carbonized food particles during frying. The oils also tend to break down chemically after extended use, often causing the oil to foam, smoke, smell bad, look bad, or taste bad. It has been found that keeping the cooking oil clean by removing the particulate matter and filtering it on a regular basis tends to extend the useful life of the cooking oil, and increases the quality and appearance of foods which are cooked therein.

Accordingly, a variety of specialized systems and filter media for filtering cooking oil have been developed. In most oil filtering systems, the contaminated oil is transferred from the deep fryer to a holding reservoir, pumped under vacuum through a filter medium, and then returned to the deep fryer for further use.

One widely used filter system and medium combination includes a vacuum chamber having a relatively flat upper surface in which a number of holes are formed. A thin piece of filter paper is laid over the upper surface of the vacuum chamber and held in place along its edges by a small number of stays. The vacuum chamber is coupled through an adaptor to the pumping unit of the main filter system. When in use the vacuum chamber, with filter paper intact, is placed at the bottom of the reservoir of contaminated oil. Through the action of the pumping unit, the contaminated oil is drawn through the paper filter, into the vacuum chamber, out through the adaptor, and returned to the deep fryer for reuse.

The vacuum chamber of this filter system has a seam extending around its perimeter where the top half and the bottom half of the chamber are joined. In use, contaminated oil can enter the vacuum chamber through this seam without passing through the paper filter, thereby being returned to the deep fryer in an unfiltered condition. This is particularly true when the upper surface of the paper filter becomes covered with debris, as the oil will naturally seek out a path of lesser resistance.

Additionally, this filter system allows for the passage of contaminated oil into the vacuum chamber around the edges of the filter paper. Because the design of this filter system relies upon the peripherally located stays and the pressure exerted by the vacuum chamber to hold the filter paper in place, a truly tight seal between the upper surface of the vacuum chamber and the filter paper cannot be maintained.

Another drawback of this design is that the holes in the upper surface of the vacuum chamber, through which the contaminated oil must pass, amount to only some fifty percent of the total surface area of the upper surface. Because contaminated oil can only pass through an area of the filter paper having an underlying hole, it is only approximately this same percentage of the filter paper that is utilized.

Another commercially available filter system and medium combination utilizes a vacuum chamber, but does not use a paper filter medium. Rather, a filtering powder (such as magnesium silicate) is added to the contaminated oil in the reservoir. The upper surface of the vacuum chamber contains a very fine mesh through which the contaminated oil is drawn. The filtering powder, which is suspended in the contaminated oil, begins to plate out over the fine mesh as the oil is drawn into the vacuum chamber. When a sufficient layer of filtering powder has so formed, a filter medium is created over the top of the fine mesh.

The disadvantages of this slurry-type filtering design are many. First, in the initial stages of filtering, the contaminated oil is not effectively filtered because a sufficient layer of filtering powder has not yet plated out. Thus, this design requires that the oil be run through two or more cycles in order to be sufficiently filtered. However, the pumping action of such recycling tends to damage the oil due to the oxidation, mechanical breakdown, and chemical breakdown of the large carbon chain compounds that make up the oil.

Another disadvantage of this design is that a portion of the filtering powder remains with the filtered oil that is returned for subsequent use, thereby potentially impairing the effectiveness of the filtered cooking oil and/or the taste of foods cooked therein. Additionally, this design requires that the vacuum chamber unit be broken down and the plated out layer of filtering powder be removed after each use.

With each of the two above-described designs, contaminated oil is drawn into the vacuum chamber through the upper surface of the chamber. Consequently, a residual amount of oil lying between the upper surface of the vacuum chamber and the lower surface of the reservoir never gets filtered or returned for subsequent use. This residual layer of oil is known as a "heel."

In a modified version of the first above-described design, a thicker cellulose-based filter pad, rather than a thin piece of filter paper, is used as the filter medium. Such systems experience drawbacks similar to those described above. Furthermore, such systems permit the filter pad to be improperly oriented during the filtering process. This improper orientation drawback is critical because many filter pads are formed with a mean pore size gradient through their thickness dimension. Namely, the mean pore size is greatest at and near the entrance surface of the filter pad and decreases to its smallest value at and near the exit surface. Gradation in pore size allows the larger contaminants to be first filtered near the entrance surface of the filter pad and the smaller contaminants to be subsequently filtered deeper within the filter pad. Thus, it is imperative that the filter pad be oriented so that the contaminated oil enters the proper surface of the filter pad.

As a result, there has been a long-felt need for a filter system and medium combination useful in filtering contaminated cooking oil that: (1) is relatively inexpensive to produce; (2) prevents contaminated oil from bypassing the filter medium and being returned for reuse in an unfiltered state; (3) fully utilizes the effective filtering area of the filter medium; (4) sufficiently filters the contaminated oil with a single pass through the combination; (5) causes no excessive damage to the oil during filtering; (6) leaves no residual heel; and (7) ensures proper orientation of the filter medium during the filtering process. This invention, when used in conjunction with various commerically available filter systems and a currently available filter medium, is directed to satisfying this need.

SUMMARY OF THE INVENTION

In accordance with this invention, an improved filter pad assembly for supporting a filter pad is disclosed, the supported filter pad having an entrance side, an exit side, and a seating cut-out formed therein at a location along its periphery. The filter pad assembly of the present invention is used in conjunction with a filter system having a pumping unit to filter a contaminated fluid. The filter pad assembly includes a sealing member, a filter pad support member, and securing means. Alternatively, the filter pad assembly of the present invention may be defined to also include the filter pad.

The sealing member has filter pad contacting means with a peripheral configuration and dimension substantially matching that of the filter pad, and has an inlet opening through which the contaminated fluid enters. The filter pad support member has a seating surface and an inwardly disposed filter pad support screen against which the filter pad is positioned, and has an outlet aperture through which the filtered fluid exits after passing through the filter pad. To ensure that the filter pad is properly oriented within the filter pad assembly, the seating surface of the filter pad support member has a peripheral configuration and dimension substantially matching that of the filter pad. This design allows only the exit side of the filter pad to rest against the seating surface, thereby providing the proper filter pad orientation.

The securing means maintains the sealing member and the filter pad support member in a closed operative position during the filtering process, such that the filter pad contacting means of the sealing member compresses the filter pad against the seating surface of the filter pad support member to create a substantially fluid-tight seal. Thus, the contaminated fluid is prevented from exiting the outlet aperture of the filter pad support member without passing through the filter pad.

BRIEF DESCRIPTION OF THE DRAWINGS

The foregoing and other features and advantages of the present invention will become more readily appreciated as the same become better understood by reference to the following detailed description of the preferred embodiments of the invention when taken in conjunction with the accompanying drawings, wherein:

FIG. 6 is an exploded isometric view of the filter pad assembly shown in FIG. 5;

DETAILED DESCRIPTION OF THE PREFERRED EMBODIMENTS

Figure 1:
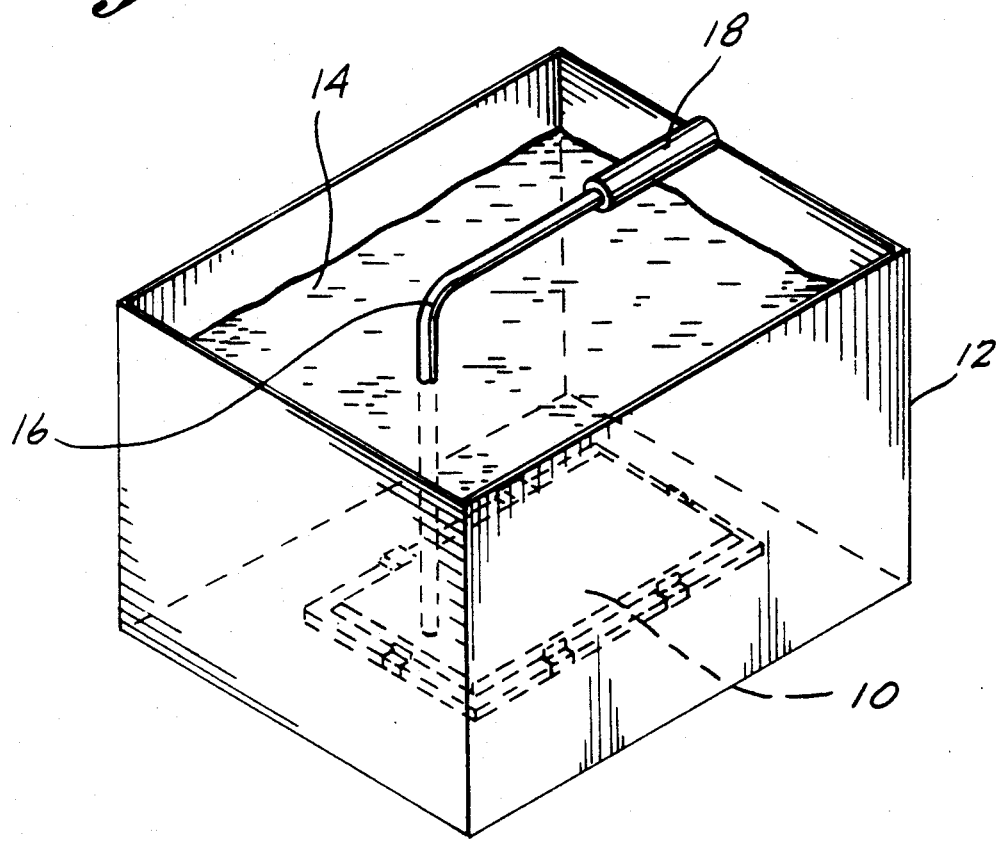
FIG. 1 is an environmental isometric view of a filter system reservoir containing contaminated cooking oil and utilizing a first embodiment of a filter pad assembly made in accordance with the principles of the present invention.

As illustrated in FIG. 1, a filter pad assembly 10 formed in accordance with a first embodiment of the present invention may be utilized in conjunction with standard filtering systems to filter contaminated cooking oil. The filter pad assembly 10, utilizing an internally disposed filter pad (not shown), is placed in and rests on the typically flat bottom of a reservoir 12 containing the contaminated cooking oil 14 that is to be filtered. The filter pad assembly 10 forms a chamber to which a vacuum is applied through an adaptor 16 by the pumping unit (not shown) of the filtering system. The adaptor 16 may be of a variety of configurations and materials of construction. Additionally, it has an end coupling 18 adapted to fit the particular filtering system to which the filter pad assembly 10 of the present invention is applied.

Figure 2:
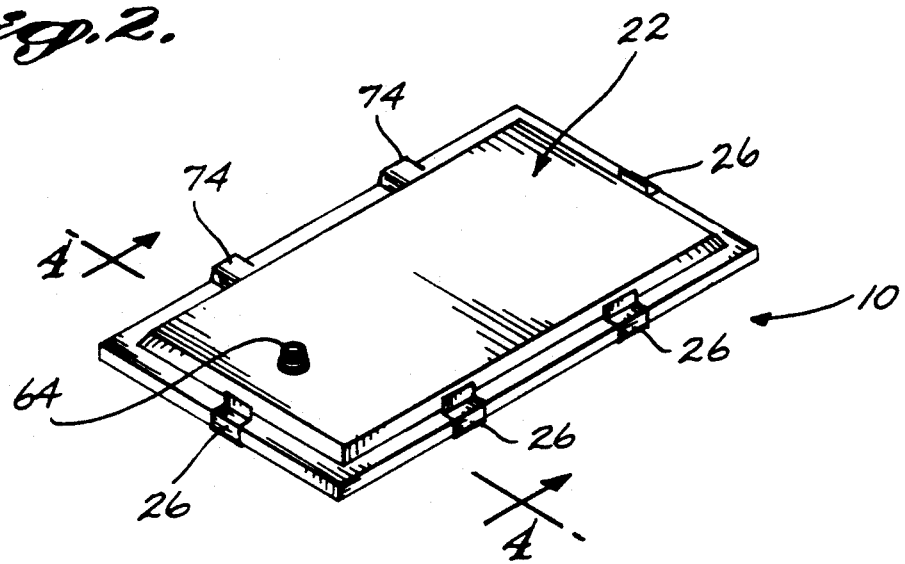
FIG. 2 is an isometric view of the filter pad assembly shown in FIG. 1 isolated from its environment of application.
Figure 3:
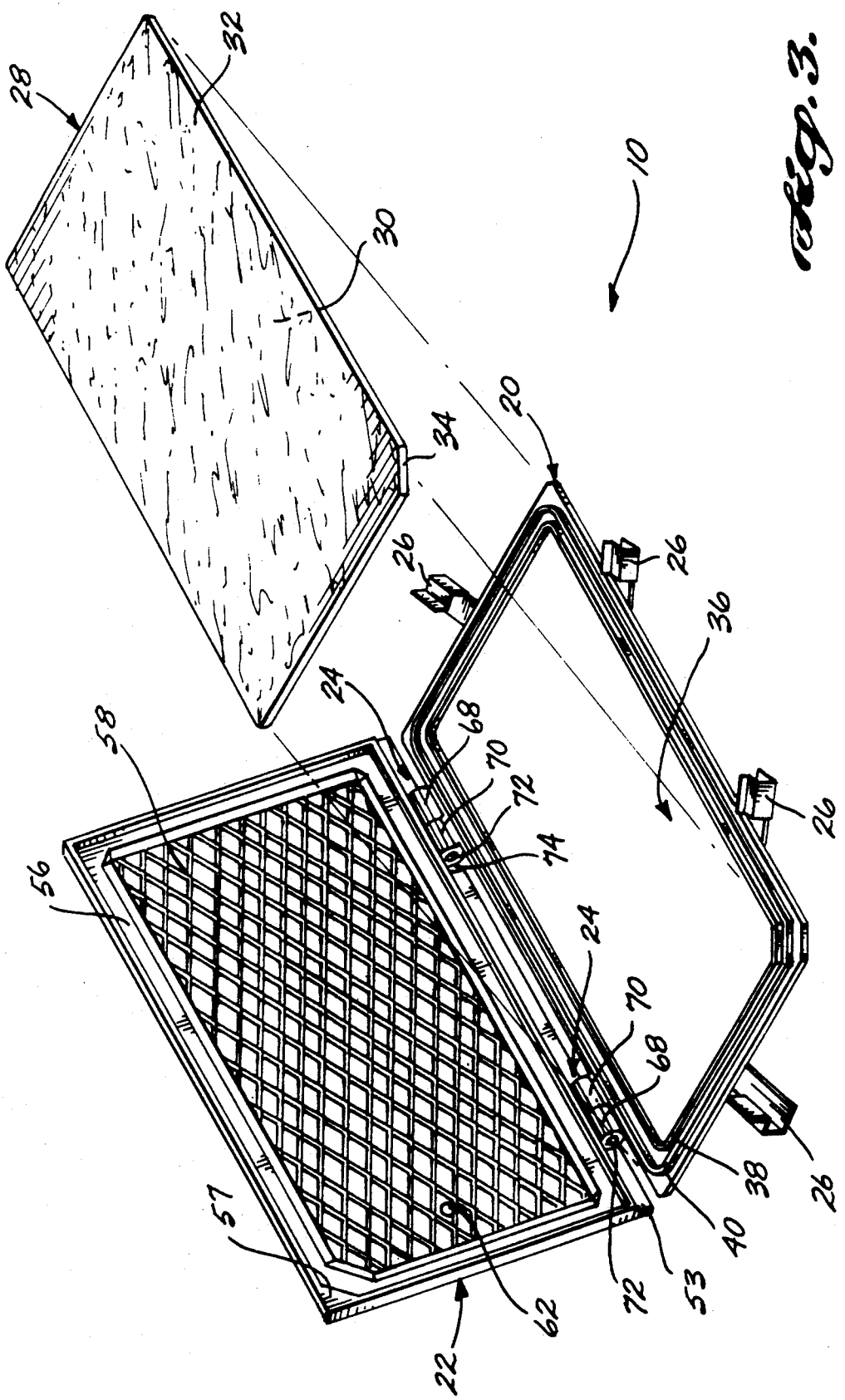
FIG. 3 is an isometric view of the filter pad assembly shown in FIG. 2 in its open position, with a corresponding filter pad exploded from its position of application.
Figure 4:
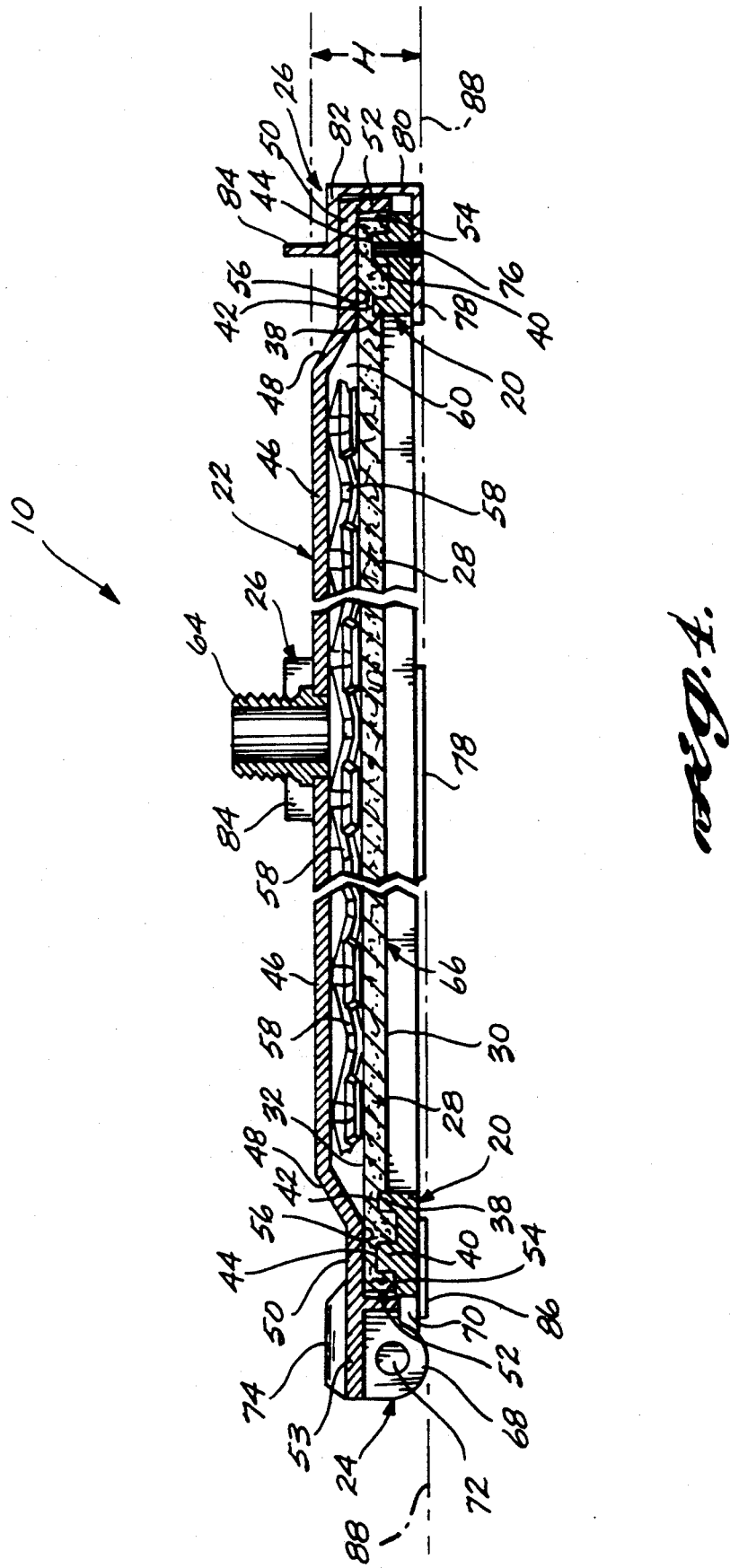
FIG. 4 is a partial cross-sectional view of the filter pad assembly, with filter pad in place, taken along line 4—4 of FIG. 2.

FIGS. 2, 3, and 4 illustrate a first embodiment of the filter pad assembly 10 generally including a sealing frame 20, an upper housing 22 coupled to the sealing frame 20 by a pair of hinges 24, and a plurality of latches 26 to hold the filter pad assembly in its closed operative position. A filter pad 28 is adapted to be contained within a recess formed in upper housing 22.

The filter pad 28 is substantially rectangular, having an entrance side 30 and an opposing exit side 32. Filter pad 28 is preferably formed with a larger mean pore size at the entrance side 30 than at the exit side 32. This pore size gradient allows larger contaminants to be removed upon their initial contact with the filter pad, whereas smaller contaminants are removed at locations deeper within the filter pad. Optionally, the entrance side 30 may be formed with a bumpy, rather than a relatively flat, surface to thereby increase the total surface area available for removal of the larger contaminants.

A seating cut-out 34 is formed in filter pad 28 by cropping one of its corners. Alternatively, such cropping may be eliminated if the filter pad 28 is initially constructed to have the same peripheral configuration. As detailed below, it is the seating cut-out 34 that ensures filter pad 28 is properly oriented within filter pad assembly 10. Filter pad 28 should also have a thickness and compressibility necessary to form the required fluid-tight seal when the filter pad assembly 10 is in its closed operative position (shown in FIG. 4 and described below). One such filter pad possessing these physical characteristics and the desired filtering properties is a filter pad commercially sold under the trademark SUPERSORB (Product No. F-16) by Filtercorp, Inc. of Woodinville, Wash.

The sealing frame 20 is a thin, substantially rectangular plate having a large, centrally located inlet opening 36 through which the contaminated cooking oil enters. An inner rib 38 and a spaced-apart outer rib 40 are integral with and extend about the entire periphery of the upper surface of sealing frame 20 (see FIG. 4). Inner rib 38 projects orthogonally upward from the upper surface of sealing frame 20 and terminates in a flat inner filter pad contact edge 42. Similarly, outer rib 40 projects orthogonally upward from the upper surface of sealing frame 20 and terminates in a flat outer filter pad contact edge 44. The ribs 38 and 40 have a peripheral configuration and dimension substantially matching, but slightly less than, that of filter pad 28. Accordingly, ribs 38 and 40 have one notched corner corresponding to the seating cut-out 34 of filter pad 28. Thus, when the filter pad assembly 10 is in its closed operative position, and filter pad 28 is in place, the contact edges 42 and 44 of ribs 38 and 40, respectively, form two peripheral lines of seal which ensure that the contaminated cooking oil passes through, rather than around, the filter pad. While certainly a matter of design choice, outer rib 40 is illustrated to have a widthwise dimension approximately twice that of inner rib 38. This reduction in the width of inner rib 38 allows an incremental increase in the volume of filter pad 28 available for filtering, without adversely impacting the structural integrity of sealing frame 20 or the effectiveness of the peripheral lines of seal.

The upper housing 22 has a centrally located, flat, horizontally oriented upper surface 46; a peripheral, downwardly sloping angled edge 48 contiguous with upper surface 46; a peripheral, horizontally oriented lower surface 50 contiguous with angled edge 48; and a peripheral, downwardly projecting outer edge 52 contiguous with lower surface 50 (see FIG. 4). The inner peripheral dimension of the outer edge 52 of upper housing 22 only slightly exceeds the outer peripheral dimension of sealing frame 20, so that a relatively snug fit exists between the housing and sealing frame when the filter pad assembly 10 is in its closed operative position. However, the fit is not so snug as to interfere with the operation of the hinges 24. A horizontally oriented extension 53 is contiguous with the junction of lower surface 50 and outer edge 52, and extends outwardly therefrom along the entire side of upper housing 22 adjacent the hinges 24. Extension 53 acts to cover and thereby protect the hinges from structural damage.

As shown in FIG. 4, the lower surface 50 and outer edge 52 of upper housing 22 define a recess 54 sized to receive the filter pad 28. The bottom of lower surface 50 provides a seating surface 56 against which the periphery of filter pad 28 is positioned. Lower surface 50, and therefore seating surface 56, have a peripheral configuration and dimension substantially matching, but slightly greater than, that of filter pad 28. Accordingly, seating surface 56 has one notched corner corresponding to the seating cut-out 34 of filter pad 28. This notched corner configuration is defined by a solid corner 57 which extends downwardly from lower surface 50 of upper housing 22 the same distance as does outer edge 52 (see FIG. 3). It is this configuration of seating surface 56 and solid corner 57 that provides proper filter pad orientation by ensuring that only exit side 32 of filter pad 28 may rest against the seating surface. In short, the filter pad fits only one way. When the filter pad assembly 10 of the present invention is in the illustrated closed operative position, the filter pad 28 is gripped between the seating surface 56 and the inner and outer ribs 38 and 40 of sealing frame 20 to provide a substantially fluid-tight seal.

A filter pad support screen 58 is mounted within a recess 60 defined by the upper surface 46 and angled edge 48 of upper housing 22 (see FIGS. 3 and 4). Preferably, the filter pad support screen 58 is welded into place. The filter pad support screen 58 is an expanded metal matrix, with each matrix member having a substantially parallelogram-shaped cross section. Thus, the filter pad support screen 58 provides a support surface for the filter pad 28 in the central region of upper housing 22, while at the same time contacting only a minuscule portion of the surface area on the exit side 32 of the filter pad. Given this minimal area of contact, virtually no impedance is provided to the free flow of contaminated oil through the filter pad.

An outlet aperture 62, through which the filtered cooking oil exits, is formed in the upper surface 46 of upper housing 22. While this outlet aperture 62 has been illustrated as lying near one end of upper surface 46, it may have any location necessary to fit the particular filter system of application. Preferably, a coupling 64 extending upwardly from upper housing 22 is mounted within the outlet aperture 62. The coupling 64 is configured (e.g., threaded, etc.) to be capable of attachment to adaptor 16, which is in turn connected to the pumping unit of the filter system of application through end coupling 18. In this way, the vacuum necessary to draw the contaminated cooking oil through the filter pad 28 and out the outlet aperture 62 is provided.

The spaced-apart hinges 24 hingedly coupled the sealing frame 20 to the upper housing 22, such that a chamber 66 is formed when the sealing frame and housing are pivoted to their closed operative position (shown in FIG. 4). Chamber 66 is perhaps best viewed as the combination of the space formed by recesses 60 and 54 of upper housing 22 and the space corresponding to inlet opening 36 of sealing frame 20. Each hinge 24 has a gudgeon 68 integral with upper housing 22, the gudgeon being disposed between outer edge 52 and extension 53 of the upper housing (see FIGS. 3 and 4). A gudgeon 70 is integral with sealing frame 20 and is configured to be disposed immediately adjacent, inside of, and axially aligned with gudgeon 68. Gudgeons 68 and 70 have central bores that are axially aligned and sized to receive a pin 72 which permits rotation of the gudgeons around the pin, thereby providing a hinged coupling of sealing frame 20 and upper housing 22. A raised portion 74 is formed in extension 53 of upper housing 22 to receive and permit rotation of gudgeon 70. The increased tolerance provided by raised portion 74 allows the sealing frame 20 and the upper housing 22 to be rotated a full one hundred eighty degrees relative to each other, thereby permitting the filter pad assembly 10 to lie in a flat, fully open position. Such an orientation greatly facilitates removal and replacement of the filter pad 28, as well as cleaning of the filter pad assembly.

Two latches 26 are mounted to the side of sealing frame 20 opposite the side having integral gudgeons 70.

A latch 26 is also mounted to each end of sealing frame 20 (see FIG. 3). Each of the four spaced-apart latches 26 is rotatably mounted to the bottom surface of the sealing frame 20 by a rivet 76 (see FIG. 4). Each latch 26 has a flat, horizontally oriented lower surface 78 through which the rivet 76 extends, and an upwardly extending outer edge 80 contiguous with and formed substantially orthogonal to lower surface 78. A horizontally oriented upper surface 82 is contigous with and formed substantially orthogonal to outer edge 80, and extends in a direction toward the center region of the filter pad assembly 10. Upper surface 82 terminates at a position corresponding to the approximate midpoint of the lower surface 50 of upper housing 22. An upwardly extending ear 84 is contiguous with the terminus of upper surface 82, and is oriented substantially orthogonal to the upper surface 82. As shown in FIG. 4, outer edge 80 is of a length such that the contact edges 42 and 44 of sealing frame 20 compress the filter pad 28 to create a substantially fluid-tight seal at the junction of the sealing frame 20 and the upper housing 22 when the filter pad assembly 10 is held in a closed operative position by latches 26.

A support pad 86 is disposed along the bottom of sealing frame 20 and integral gudgeon 70 at each hinge 24. Referring to FIG. 4, the support pad 86 and the lower surface 78 of latch 26 are shown to rest upon the substantially flat bottom surface 88 of the reservoir 12, and thus act as spacers between the bottom of sealing frame 20 and the bottom surface of the reservoir. Accordingly, it is preferable that the thickness of the support pad 86 and the thickness of lower surface 78 be substantially identical. A thickness of 0.060 inches has been found to provide a satisfactory space. Given this configuration, the sealing frame 20 is elevated above the bottom surface 88 of the reservoir 12, thereby allowing free flow of the contaminated cooking oil into the bottom of the chamber 66 of filter pad assembly 10 and then through the filter pad 28.

Given that the contaminated cooking oil is drawn into the chamber 66 from the bottom, it will be appreciated that, when a sufficient vacuum is applied, the filter pad assembly 10 of the present invention leaves essentially no heel of residual contaminated oil in the reservoir. In marked contrast, a heel corresponding to the depth indicated by the letter H in FIG. 4 would likely be left with the currently available filtering systems described above in the Background of the Invention section.

Figure 5:
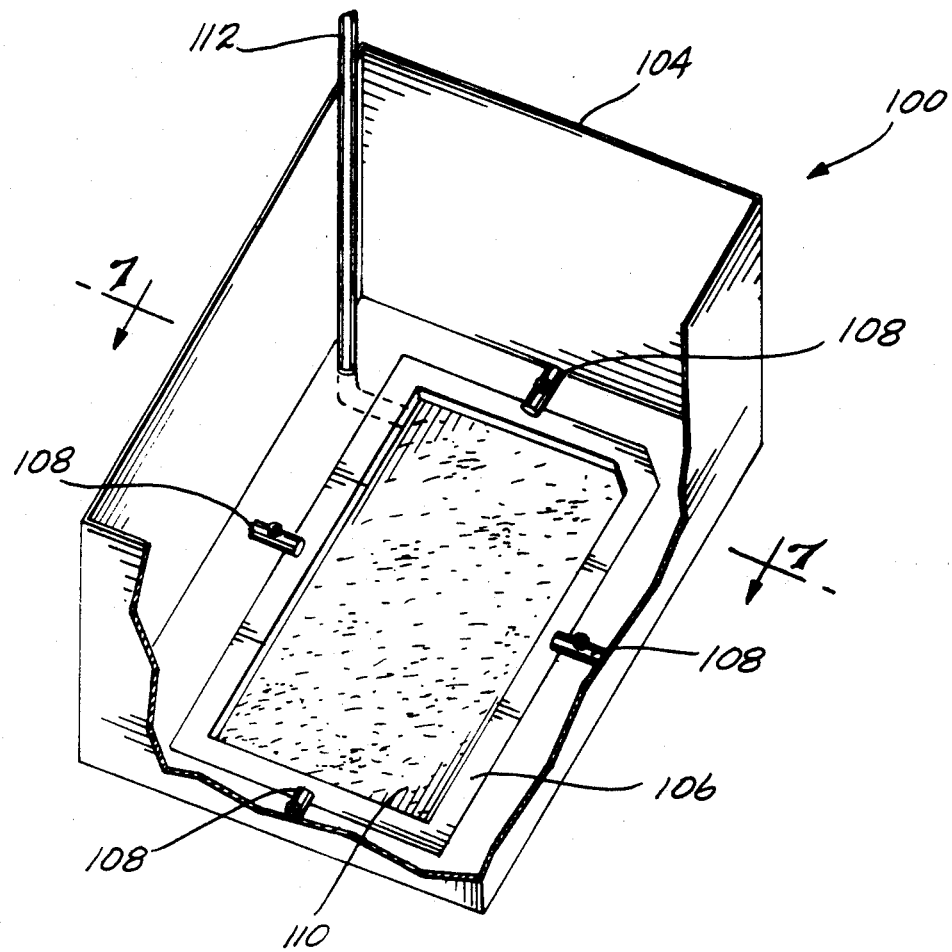
FIG. 5 is an environmental isometric view of a filter system reservoir, with partial cut-away, utilizing an integrally designed second embodiment of a filter pad assembly made in accordance with the principles of the present invention.
Figure 7:
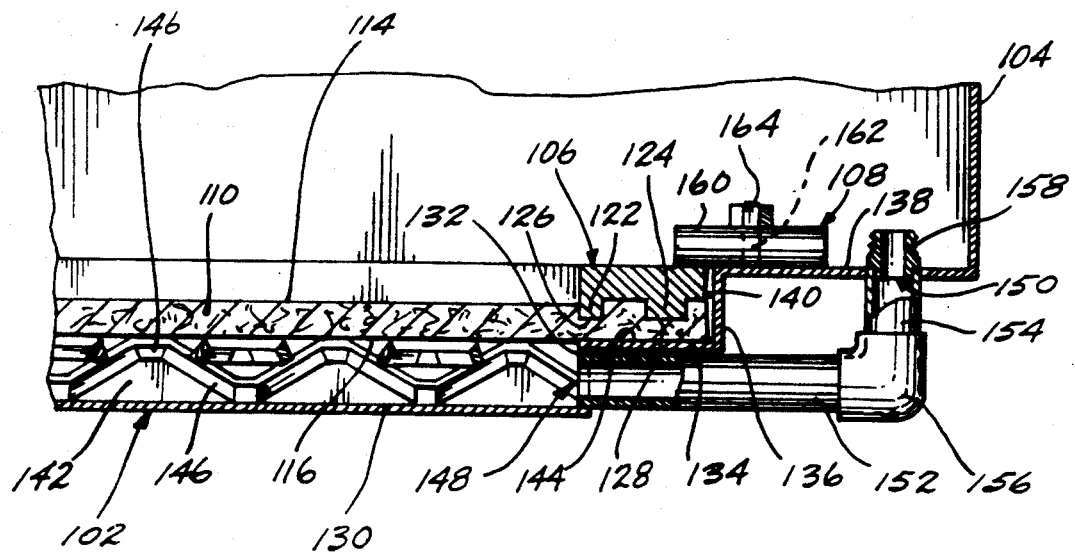
FIG. 7 is a partial cross-sectional view of the filter pad assembly, with filter pad in place, taken along line 7—7 of FIG. 5.

FIGS. 5, 6, and 7 illustrate a filter pad assembly 100 formed in accordance with a second embodiment of the present invention. The filter pad assembly 100 generally includes a lower housing 102 formed in and extending below the bottom surface of a reservoir 104 containing the contaminated fluid to be filtered, a sealing frame 106, and a plurality of latches 108 to hold the filter pad assembly in its closed operative position. A filter pad 110 is adapted to be contained within a recess formed in lower housing 102.

While the above-recited components may be incorporated into the existing reservoir of a standard filtering system, it is more economically sound to produce a replacement reservoir. Thus, unlike the filter pad assembly 10 of the first embodiment which rests on the bottom surface of the existing reservoir of standard filtering systems, the filter pad assembly 100 of the second embodiment replaces the existing reservoir of standard filtering systems. As before, the filter pad assembly 100 forms a chamber to which a vacuum is applied through an adaptor 112 by the pumping unit (not shown) of the filtering system. The adaptor 112 has an end coupling (not shown) adapted to fit the particular filtering system to which the filter pad assembly 100 of the present invention is applied.

The filter pad 110 is identical to the filter pad 28 of the above-described first embodiment. Thus, it is substantially rectangular and has an entrance side 114, an opposing exit side 116, a pore size gradient through its thickness dimension, and a thickness and compressibility necessary to form the required fluid-tight seal when the filter pad assembly 100 is in its closed operative position (shown in FIGS. 5 and 7). A seating cut-out 118 is formed in filter pad 110 by cropping one of its corners, or by initially constructing the pad to have the same peripheral configuration. As detailed below, it is the seating cut-out 118 that ensures filter pad 110 is properly oriented within filter pad assembly 100.

The sealing frame 106 is essentially identical to the sealing frame 20 of the above-described first embodiment, except that it has no gudgeons since it is not hingedly coupled to another component. Further, sealing frame 106 is disposed above filter pad 110, rather than below the filter pad as in the first embodiment. Accordingly, sealing frame 106 is a thin, substantially rectangular plate having a large, centrally located inlet opening 120 through which the contaminated cooking oil enters. An inner rib 122 and a spaced-apart outer rib 124 are integral with and extend about the entire periphery of the lower surface of sealing frame 106 (see FIG. 7). Inner rib 122 projects orthogonally downward from the lower surface of sealing frame 106 and terminates in a flat inner filter pad contact edge 126. Similarly, outer rib 124 projects orthogonally downward from the lower surface of sealing frame 106 and terminates in a flat outer filter pad contact edge 128. The ribs 122 and 124 have a peripheral configuration and dimension substantially matching, but slightly less than, that of filter pad 110. Accordingly, ribs 122 and 124 have one notched corner corresponding to the seating cut-out 118 of filter pad 110. Thus, when the filter pad assembly 100 is in its closed operative position, and filter pad 110 is in place, the contact edges 126 and 128 of ribs 122 and 124, respectively, form two peripheral lines of seal which ensure that the contaminated cooking oil passes through, rather than around, the filter pad 110. As before, outer rib 124 preferably has a widthwise dimension approximately twice that of inner rib 122.

The lower housing 102 has a centrally located, flat, horizontally oriented lower surface 130; a peripheral, upwardly projecting inner edge 132 contiguous with lower surface 130; a peripheral, horizontally oriented upper surface 134 contiguous with inner edge 132; and a peripheral, upwardly projecting outer edge 136 contiguous with upper surface 134 and with the bottom surface 138 of reservoir 104 (see FIG. 7). Thus, outer edge 136 and upper surface 134 define an upper recess 140 extending below the bottom surface 138 of reservoir 104. Inner edge 132 and lower surface 130 define a lower recess 142 disposed inwardly of and below upper recess 140.

As shown in FIG. 7, the inner peripheral dimension of the outer edge 136 of lower housing 102 only slightly exceeds the outer peripheral dimension of sealing frame 106, so that a relatively close fit exists between the lower housing and the sealing frame when the filter pad assembly 100 is in its illustrated closed operative position. The top of upper surface 134 provides a seating surface 144 against which the periphery of the filter pad 110 is positioned. Upper surface 134, and therefore seating surface 144, have a peripheral configuration and dimension substantially matching, but slightly greater than, that of filter pad 110. Accordingly, seating surface 144 has one notched corner corresponding to the seating cut-out 118 of filter pad 110 (see FIG. 6). It is this configuration of seating surface 144 that provides proper filter pad orientation by ensuring that only exit side 116 of filter pad 110 may rest against the seating surface. When the filter pad assembly 100 of the present invention is in its closed operative position, the filter pad 110 is gripped between the seating surface 144 and the inner and outer ribs 122 and 124 of sealing frame 106 to provide a substantially fluid-tight seal.

A filter pad support screen 146 is mounted within lower recess 142 of lower housing 102 (see FIGS. 6 and 7). As in the first embodiment, the filter pad support screen 146 is an expanded metal matrix, with each matrix member having a substantially parallelogram-shaped cross section. Thus, the filter pad support screen 146 provides a support surface for the filter pad 110 in the central region of lower housing 102, while at the same time contacting only a minuscule portion of the surface area on the exit side 116 of the filter pad. As before, this minimal area of contact results in virtually no impedance to the free flow of contaminated cooking oil through the filter pad.

An outlet aperture 148, through which the filtered cooking oil exits, is formed in the inner edge 132 of lower housing 102. A reservoir aperture 150 is formed in the bottom surface 138 of the reservoir 104 at a position peripherally outward of the upper recess 140 of lower housing 102. By conventional methods, a horizontally oriented circular pipe 152 is coupled at one end to outlet aperture 148. In a similar manner, a vertically oriented circular pipe 154 is coupled at one end to reservoir aperture 150. The free ends of circular pipes 152 and 154 are received within an elbow 156, thereby providing a conduit connecting the outlet aperture 148 of lower housing 102 to the reservoir aperture 150. Clearly, there are a multitude of mechanisms that could provide this conduit function, and it should be appreciated that the mechanism illustrated in FIG. 7 is but one design choice. Preferably, a coupling 158 extending upwardly from the bottom surface 138 of reservoir 104 is mounted within the reservoir aperture 150. As with the first embodiment, the coupling 158 is configured (e.g., threaded, etc.) to be capable of attachment to adaptor 112, which is in turn connected to the pumping unit of the filtering system of application. In this way, the vacuum necessary to draw the contaminated cooking oil through the filter pad 110, out the outlet aperture 148, and subsequently out reservoir aperture 150 is provided.

The spaced-apart latches 108 are rotatably mounted to the bottom surface 138 of reservoir 104 at locations adjacent to and peripherally outward of the upper recess 140 of lower housing 102. Each latch 108 includes an engagement cylinder 160, a rotational support pin 162, and a stay 164. Rotational support pin 162 extends upwardly from the bottom surface 138 of reservoir 104, and is sized to be received within a circular transverse bore formed in engagement cylinder 160 to allow rotational movement between the engagement cylinder and the support pin. Rotational support pin 162 extends upwardly beyond the engagement cylinder 160 to be received within the stay 164 to prevent translational movement of the engagement cylinder. The engagement cylinder 160 is of a length such that it may be positioned to extend over upper recess 140 to engage the top surface of sealing frame 106. As shown in FIG. 7, the dimensions of sealing frame 106, filter pad 110, and upper recess 140 are such that the filter pad is compressed to create a substantially fluid-tight seal at the junction of the sealing frame 106 and the lower housing 102 when the filter pad assembly 100 is held in a closed operative position by latches 108. Preferably, a single latch 108 is disposed at the approximate midpoint of each of the four principal sides of sealing frame 106 to provide uniform compression of the filter pad 110, and thereby the most effective resulting seal.

Given that the contaminated cooking oil is drawn downward through the inlet opening 120 of sealing frame 106, through filter pad 110, and then out through outlet aperture 148, it will be appreciated that the filter pad assembly 100 of the present invention leaves no heel of residual contaminated oil in the reservoir 104.

Figure 8:
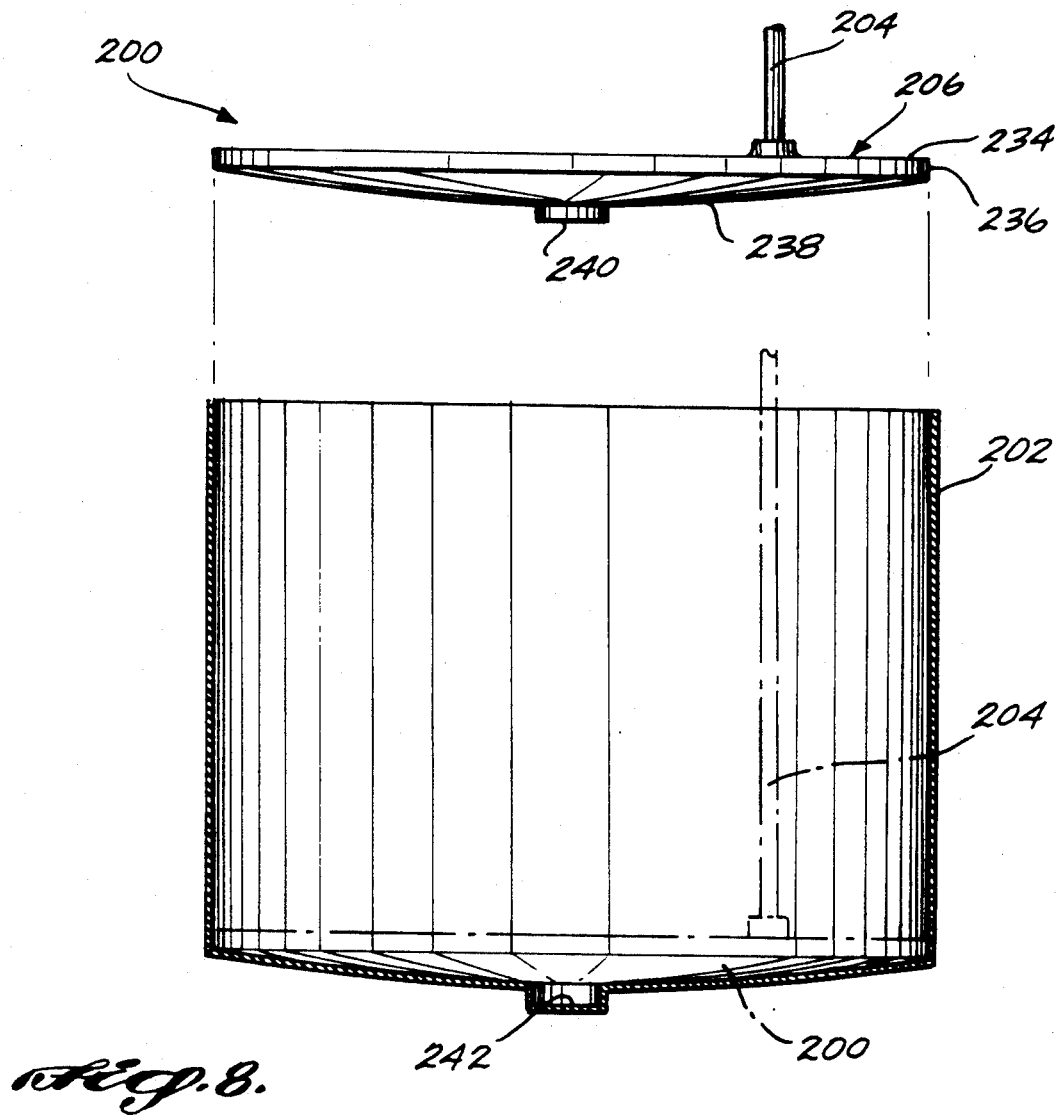
FIG. 8 is a side view of a third embodiment of a filter pad assembly made in accordance with the principles of the present invention, and a side sectional view of a filter system reservoir to which the filter pad assembly is applied (filter pad assembly shown in place in phantom line)

As illustrated in FIG. 8, a filter pad assembly 200 formed in accordance with a third embodiment of the present invention may be utilized in conjunction with filtering systems having a dish-bottomed reservoir to filter contaminated cooking oil. One such filtering system is that commercially sold under the trademark PRINCE CASTLE (Product No. PC-107) by Prince Castle, Inc. of Carol Stream, Ill. The filter pad assembly 200, utilizing an internally disposed filter pad (not shown), is placed in and meshes with the dished bottom of a reservoir 202 containing the contaminated cooking oil that is to be filtered. The filter pad assembly 200 forms a chamber to which a vacuum is applied through an adaptor 204 by the pumping unit (not shown) of the filtering system. The adaptor 204 has an end coupling (not shown) adapted to fit the particular filtering system to which the filter pad assembly 200 of the present invention is applied.

FIGS. 9, 10, 11, and 12 illustrate a third embodiment of the filter pad assembly 200 generally including a circular base 206 having a lower housing 208 formed therein, a sealing frame 210 coupled to the circular base 206 by a pair of hinges 212, and a pair of latches 214 to hold the filter pad assembly in its closed operative position. A filter pad 216 is adapted to be contained within a recess formed in lower housing 208.

The filter pad 216 is identical to the filter pad 28 of the above-described first embodiment. Thus, it is substantially rectangular and has an entrance side 218, and opposing exit side 220, a pore size gradient through its thickness dimension, and a thickness and compressibility necessary to form the required fluid-tight seal when the filter pad assembly 200 is in its closed operative position (shown in FIGS. 10 and 12). A seating cut-out 222 is formed in filter pad 216 by cropping one of its corners, or by initially constructing the pad to have the same peripheral configuration. As detailed below, it is the seating cut-out 222 that ensures filter pad 216 is properly oriented within filter pad assembly 200.

The sealing frame 210 is identical to the sealing frame 20 of the above-described first embodiment, except that sealing frame 210 is disposed above filter pad 216, rather than below the filter pad as in the first embodiment. Accordingly, sealing frame 210 is a thin, substantially rectangular plate having a large, centrally located inlet opening 224 through which the contaminated cooking oil enters. An inner rib 226 and a spaced-apart outer rib 228 are integral with and extend about the entire periphery of the lower surface of sealing frame 210 (see FIG. 12). Inner rib 226 projects orthogonally downward from the lower surface of sealing frame 210 and terminates in a flat inner filter pad contact edge 230. Similarly, outer rib 228 projects orthogonally downward from the lower surface of sealing frame 210 and terminates in a flat outer filter pad contact edge 232. The ribs 226 and 228 have a peripheral configuration and dimension substantially matching, but slightly less than, that of filter pad 216. Accordingly, ribs 226 and 228 have one notched corner corresponding to the seating cut-out 222 of filter pad 216. Thus, when the filter pad assembly 200 is in its closed operative position, and filter pad 216 is in place, the contact edges 230 and 232 of ribs 226 and 228, respectively, form two peripheral lines of seal which ensure that the contaminated cooking oil passes through, rather than around, filter pad 216. As before, outer rib 228 preferably has a widthwise dimension approximately twice that of inner rib 226.

Figure 9:
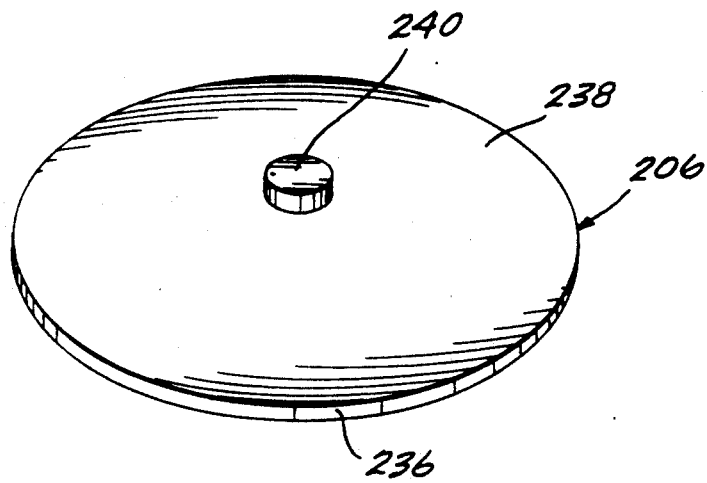
FIG. 9 is a bottom isometric view of the filter pad assembly shown in FIG. 8.
Figure 10:
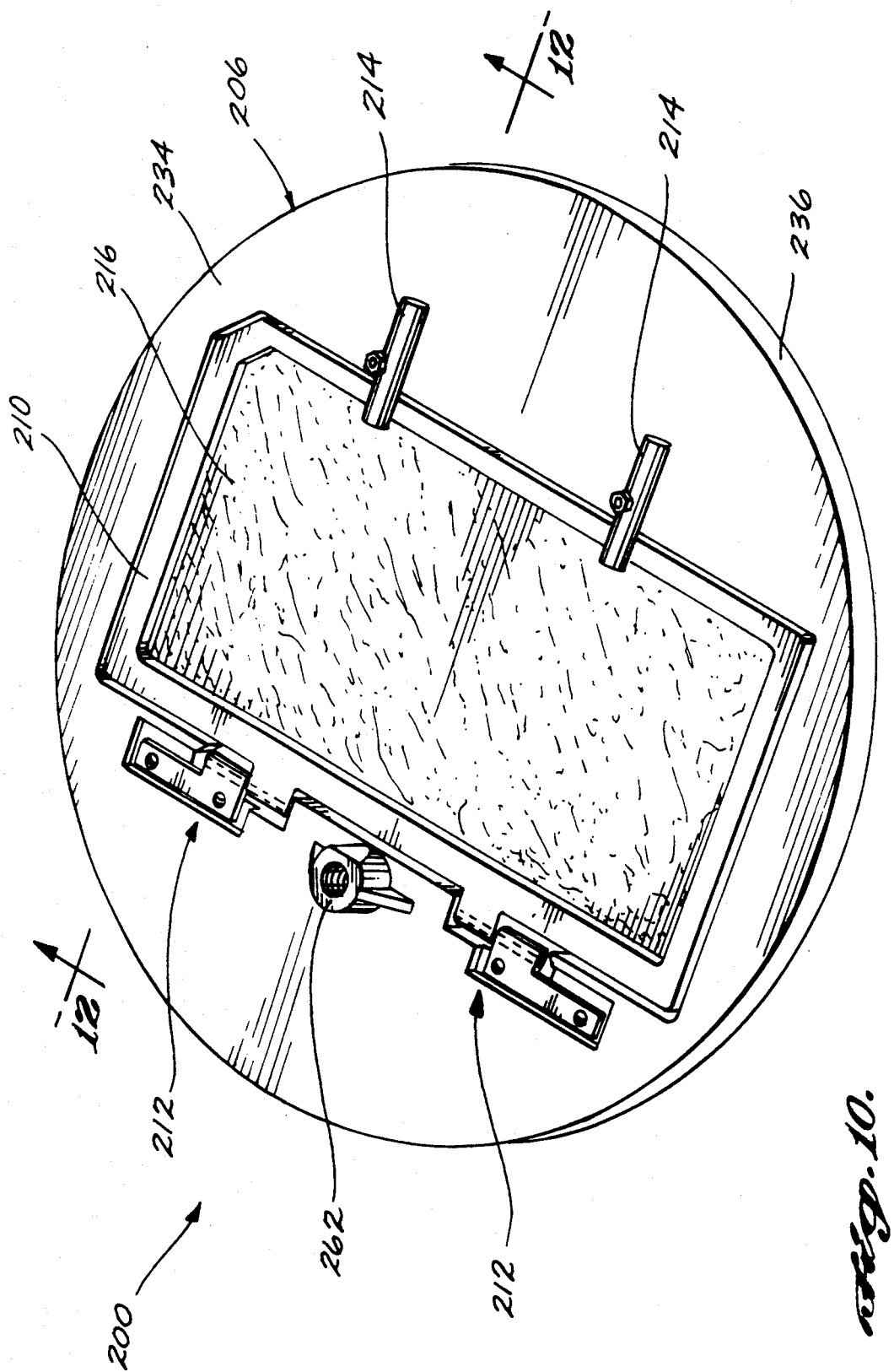
FIG. 10 is a top isometric view of the filter pad assembly shown in FIG. 8.

The circular base 206 has a substantially flat upper surface 234, a peripherally located outer edge 236 contiguous with and oriented orthogonal to upper surface 234, and a dished lower surface 238 contiguous with outer edge 236 (see FIGS. 8 and 9). A circular extension 240, disposed at the radial center of circular base 206, extends orthogonally outward from lower surface 238. Circular extension 240 is sized to cooperatively mesh with a circular depression 242 formed in the bottom of dish-bottomed reservoir 202. Circular base 206 has an outside diameter substantially matching, but slightly less than, the inside diameter of reservoir 202. Further, lower surface 238 has a radius of curvature substantially matching the dished bottom of reservoir 202. Thus, when circular base 206 is placed within reservoir 202, the upper surface 234 of the circular base becomes the new bottom surface of the reservoir. While contaminated cooking oil may theoretically seep in around the outer edge 236 of circular base 206, no significant accumulation of oil can occur given the essentially complete volume occupation of circular base 206. Further, any residual amount of such oil would be removed during cleaning of the filter pad assembly 200.

Figure 12:
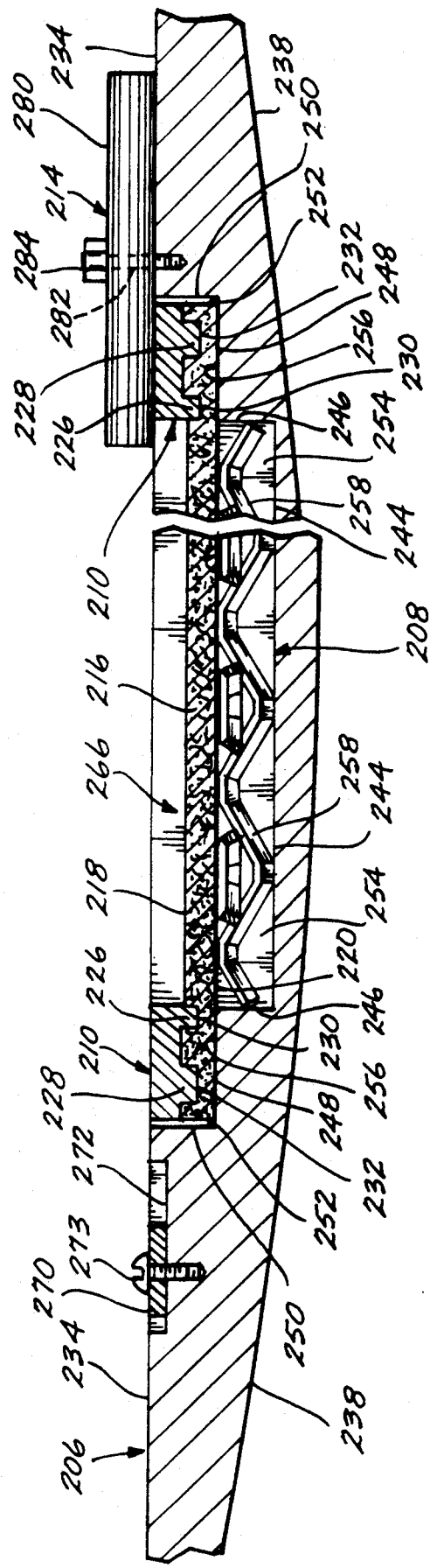
FIG. 12 is a partial cross-sectional view of the filter pad assembly, with filter pad in place, taken along line 12—12 of FIG. 10.

Referring to FIG. 12, the lower housing 208 is formed in and extends below upper surface 234 of circular base 206. The lower housing 208 has a centrally located, flat, horizontally oriented lower surface 244; a peripheral, upwardly projecting inner edge 246 contiguous with lower surface 244; a peripheral, horizontally oriented upper surface 248 contiguous with inner edge 246; and a peripheral, upwardly projecting outer edge 250 contiguous with upper surface 248 and with the upper surface 234 of circular base 206. Thus, outer edge 250 and upper surface 248 define an upper recess 252 extending below the upper surface 234 of circular base 206. Inner edge 246 and lower surface 244 define a lower recess 254 disposed inwardly of and below upper recess 252.

As shown in FIG. 12, the inner peripheral dimension of the outer edge 250 of lower housing 208 only slightly exceeds the outer peripheral dimension of sealing frame 210, so that a relatively close fit exists between the lower housing and the sealing frame when the filter pad assembly 200 is in its illustrated closed operative position. The top of upper surface 248 provides a seating surface 256 against which the periphery of the filter pad 216 is positioned. Upper surface 248, and therefore seating surface 256, have a peripheral configuration and dimension substantially matching, but slightly greater than, that of filter pad 216. Accordingly, seating surface 256 has one notched corner corresponding to the seating cut-out 222 of filter pad 216 (see FIG. 11). It is this configuration of seating surface 256 that provides proper filter pad orientation by ensuring that only exit side 220 of filter pad 216 may rest against the seating surface. When the filter pad assembly 200 of the present invention is in its closed operative position, the filter pad 216 is gripped between the seating surface 256 and the inner and outer ribs 226 and 228 of sealing frame 210 to provide a substantially fluid-tight seal.

Figure 11:
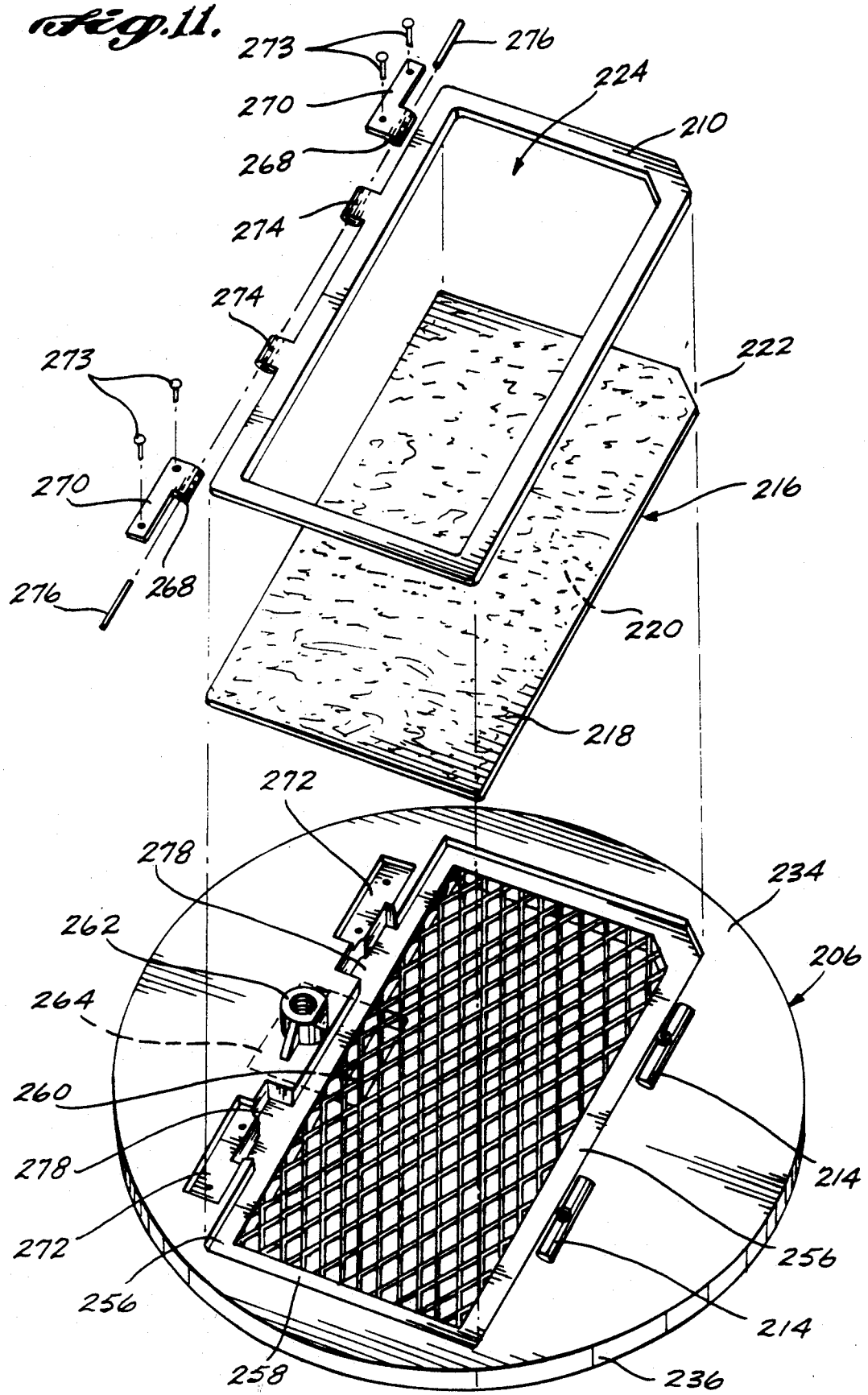
FIG. 11 is an exploded isometric view of the filter pad assembly shown in FIG. 10.

A filter pad support screen 258 is mounted within the lower recess 254 of lower housing 208 (see FIGS. 11 and 12). As in the first embodiment, the filter pad support screen 258 is an expanded metal matrix, with each matrix member having a substantially parallelogram-shaped cross section. Thus, the filter pad support screen 258 provides a support surface for the filter pad 216 in the central region of lower housing 208, while at the same time contacting only a minuscule portion of the surface area on the exit side 220 of the filter pad. As before, this minimal area of contact results in virtually no impedance to the free flow of contaminated cooking oil through the filter pad.

An outlet aperture 260, through which the filtered cooking oil exits, is formed in the lower surface 244 of lower housing 208 at a position proximate to the side of the lower housing adjacent hinges 212. A base outlet 262 having a centrally located circular bore is mounted to and extends upwardly from the upper surface 234 of circular base 206 at a location peripherally outward of the upper recess 252 of lower housing 208. Preferably, base outlet 262 is mounted to upper surface 234 at a position immediately adjacent outlet aperture 260. Alternatively, base outlet 262 may be integrally formed with circular base 206 (e.g., cast as a single piece). A channel 264 connects outlet aperture 260 to the circular bore of base outlet 262, thereby acting as a conduit for the filtered cooking oil. The circular bore of base outlet 262 is configured (e.g., threaded, etc.) to be capable of attachment to adaptor 204, which is in turn connected to the pumping unit of the filtering system of application. In this way, the vacuum necessary to draw the contaminated cooking oil through the filter pad 216, out the outlet aperture 260, and subsequently out base outlet 262 is provided.

The spaced-apart hinges 212 hingedly couple the sealing frame 210 to the circular base 206, such that a chamber 266 is formed when the sealing frame is pivoted so that the filter pad assembly 200 is in its closed operative position (shown in FIG. 12). Chamber 266 is perhaps best viewed as the combination of the space formed by lower recess 254 and upper recess 252. Each hinge 212 has a gudgeon 268 mounted to circular base 206 at a position adjacent to and peripherally outward of the upper recess 252 of lower housing 208 (see FIG. 11). Gudgeon 268 has an integral mounting plate 270 secured to circular base 206 within an upper hinge recess 272 formed in the upper surface 234 of the circular base, the gudgeon being secured by a pair of set pins 273. A gudgeon 274 is integral with sealing frame 210 and is configured to be disposed immediately adjacent, inside of, and axially aligned with gudgeon 268. Gudgeons 268 and 274 have central bores that are axially aligned and sized to receive a pin 276 which permits rotation of the gudgeons around the pin, thereby providing a hinged coupling of sealing frame 210 and circular base 206. A lower hinge recess 278, contiguous with upper hinge recess 272 and with seating surface 256, is formed in the upper surface 234 of circular base 206 to accommodate gudgeons 268 and 274.

Two spaced-apart latches 214 are rotatably mounted to the upper surface 234 of circular base 206 adjacent to and peripherally outward of the upper recess 252 of lower housing 208 at locations opposite the two spaced-apart hinges 212. Each latch 214 includes an engagement cylinder 280, a rotational support pin 282, and a stay 284. Rotational support pin 282 extends upwardly from the upper surface 234 of circular base 206, and is sized to be received within a circular transverse bore formed in engagement cylinder 280 to allow movement between the engagement cylinder and the support pin. Rotational support pin 282 extends upwardly beyond the engagement cylinder 280 to be received within the stay 284 to prevent translational movement of the engagement cylinder. The engagement cylinder 280 is of a length such that it may be positioned to extend over upper recess 252 to engage the top surface of sealing frame 210. As shown in FIG. 12, the dimensions of sealing frame 210, filter pad 216, and upper recess 252 are such that the filter pad is compressed to create a substantially fluid-tight seal at the junction of the sealing frame 210 and the lower housing 208 when the filter pad assembly 200 is held in a closed operative position by latches 214.

Given that the contaminated cooking oil is drawn downward through the inlet opening 224 of sealing frame 210, through filter pad 216, and then out through outlet aperture 260, it will be appreciated that the filter pad assembly 200 of the present invention leaves no heel of residual contaminated oil in the reservoir 202.

While three preferred embodiments of the present invention have been illustrated and described, it should be understood that variations could be made therein without departing from the scope of the invention. For instance, the filter pad assembly of the present invention could be utilized in a closed-to-atmosphere filtering system operating under positive pressure, rather than in the open-to-atmosphere filtering system operating under vacuum described above. Further, the filter pad assembly may be used in conjunction with filter pads of various composition to filter fluids other than contaminated cooking oil. Additionally, the filter pad need not be rectangular and the seating cut-out formed in the filter pad need not be a cropped corner.

Accordingly, it is to be understood that the invention is not to be limited to the specific embodiment illustrated and described. Rather, the true scope of the invention is to be determined by reference to the following claims.

The embodiments of the invention in which an exclusive property or privilege is claimed are defined as follows:

1. A filter pad assembly used in conjunction with a pumping unit to filter a contaminated fluid, the filter pad assembly comprising:
  a filter pad having an entrance side and an exit side, said filter pad further having a seating cut-out formed therein at a location along its periphery;
  a sealing member having filter pad contacting means and an inlet opening through which the contaminated fluid enters, said filter pad contacting means having a peripheral configuration and dimension substantially matching that of said filter pad;
  a filter pad support member having a seating surface and an inwardly disposed filter pad support screen against which said filter pad is positioned, said seating surface having a peripheral configuration and dimension substantially matching that of said filter pad to ensure that only said exit side of said filter pad may rest against said seating surface, said filter pad support member further having an outlet aperture through which the filtered fluid exits after passing through said filter pad; and
  securing means for maintaining said sealing member and said filter pad support member in a closed operative position such that said filter pad contacting means of said sealing member compresses said filter pad against said seating surface of said filter pad support member to create a substantially fluid-tight seal, thereby preventing contaminated fluid from exiting said outlet aperture of said filter pad support member without passing through said filter pad.

2. The filter pad assembly of claim 1, wherein:
  said sealing member comprises a sealing frame including said filter pad contacting means and said inlet opening, said sealing frame being positioned along the bottom surface of a reservoir containing the contaminated fluid to be filtered; and
  said filter pad support member comprises an upper housing including said seating surface and said outlet aperture, said upper housing further having a first recess sized to receive said filter pad and an inwardly disposed second recess sized to receive said filter pad support screen, said upper housing being hingedly coupled to said sealing frame such that a chamber is formed when said sealing frame and said upper housing are pivoted to said closed operative position, whereby the contaminated fluid is drawn into the bottom of said chamber through said inlet opening of said sealing frame, through said filter pad, and out the top of said chamber through said outlet aperture of said upper housing by the action of the pumping unit.

3. The filter pad assembly of claim 2, wherein said filter pad is rectangular and said seating cut-out of said filter pad is formed by cropping one corner of said filter pad.

4. The filter pad assembly of claim 2, wherein said securing means comprises a plurality of spaced-apart latches rotatably mounted to said sealing frame and configured to engage said upper housing, each of said latches having an upwardly extending ear to facilitate movement of said latch into and out of engagement with said upper housing.

5. The filter pad assembly of claim 4, wherein said plurality of spaced-apart latches support said sealing frame above the bottom surface of the reservoir, thereby allowing the unrestricted flow of contaminated fluid into said chamber through said inlet opening of said sealing frame.

6. The filter pad assembly of claim 5, wherein said plurality of spaced-apart latches support said sealing frame approximately 0.060 inches above the bottom surface of the reservoir.

7. The filter pad assembly of claim 2, wherein said upper housing and said sealing frame are hingedly coupled by a pair of spaced-apart hinges, each of said hinges having a first half-hinge component integral with said upper housing and a second half-hinge component integral with said sealing frame, each of said first and second half-hinge components having a bore sized to receive a pin that allows pivotal movement therebetween.

8. The filter pad assembly of claim 2, wherein said filter pad contacting means comprises a pair of spaced-apart ribs integral with and extending about the entire periphery of said sealing frame, each of said ribs projecting upward from said sealing frame and terminating in a substantially flat filter pad contact edge.

9. The filter pad assembly of claim 2, wherein said filter pad support screen comprises a structural matrix mounted to said upper housing within said second recess of said upper housing, said matrix being configured to have only minimal contact with said exit side of said filter pad.

10. The filter pad assembly of claim 2, further comprising a coupling mounted to and extending upwardly from said outlet aperture of said upper housing, said coupling being attachable to an adaptor which connects the filter pad assembly to the pumping unit.

11. The filter pad assembly of claim 1, wherein:
said filter pad support member comprises a lower housing formed in and extending below the bottom surface of a reservoir containing the contaminated fluid to be filtered, said lower housing including said seating surface and said outlet aperture, said lower housing further having a first recess sized to receive said filter pad and an inwardly disposed second recess sized to receive said filter pad support screen;
said sealing member comprises a sealing frame including said filter pad contacting means and said inlet opening, said sealing frame and said filter pad being disposed substantially within said first recess of said lower housing when the filter pad assembly is in said closed operative position; and
said securing means comprises a plurality of spaced-apart latches rotatably mounted to the bottom surface of the reservoir at locations adjacent to and peripherally outward of said first recess of said lower housing, each of said latches having an arm positionable to extend over said first recess to engage said sealing frame,
whereby the contaminated fluid is drawn into said inlet opening of said sealing frame, through said filter pad, and out said outlet aperture of said lower housing by the action of the pumping unit.

12. The filter pad assembly of claim 11, wherein said filter pad is rectangular and said seating cut-out of said filter pad is formed by cropping one corner of said filter pad.

13. The filter pad assembly of claim 11, wherein said filter pad contacting means comprises a pair of spaced-apart ribs integral with and extending about the entire periphery of said sealing frame, each of said ribs projecting downward from said sealing frame and terminating in a substantially flat filter pad contact edge.

14. The filter pad assembly of claim 11, wherein said filter pad support screen comprises a structural matrix mounted to said lower housing within said second recess of said lower housing, said matrix being configured to have only minimal contact with said exit side of said filter pad.

15. The filter pad assembly of claim 11, further comprising:
a reservoir aperture formed in the bottom surface of the reservoir at a position peripherally outward of said first recess of said lower housing;
a conduit connecting said outlet aperture of said lower housing to said reservoir aperture; and
a coupling mounted to and extending upwardly from said reservoir aperture, said coupling being attachable to an adaptor which connects the filter pad assembly to the pumping unit.

16. The filter pad assembly of claim 1, wherein:
said filter pad support member comprises a circular base having a substantially flat upper surface and a dished lower surface, said lower surface being configured to cooperatively mesh with the bottom of a circular, dish-bottomed reservoir containing the contaminated fluid to be filtered so that said upper surface becomes the new bottom surface of the reservoir;
said circular base further having a lower housing formed in and extending below said upper surface of said circular base, said lower housing including said seating surface and said outlet aperture, said lower housing further having a first recess sized to receive said filter pad and an inwardly disposed second recess sized to receive said filter pad support screen;
said sealing member comprises a sealing frame hingedly coupled to said upper surface of said circular base, said sealing frame including said filter pad contacting means and said inlet opening, said sealing frame and said filter pad being disposed substantially within said first recess of said lower housing when the filter pad assembly is in said closed operative position; and
said securing means comprises at least one latch rotatably mounted to said upper surface of said circular base adjacent to and peripherally outward of said first recess of said lower housing, said at least one latch having an arm positionable to extend over said first recess to engage said sealing frame,
whereby the contaminated fluid is drawn into said inlet opening of said sealing frame, through said filter pad, and out said outlet aperture of said lower housing by the action of the pumping unit.

17. The filter pad assembly of claim 16, wherein said filter pad is rectangular and said seating cut-out of said filter pad is formed by cropping one corner of said filter pad.

18. The filter pad assembly of claim 16, wherein said sealing frame is hingedly coupled to said upper surface of said circular base by a pair of spaced-apart hinges, each of said hinges having a first half-hinge component integral with said sealing frame and a second half-hinge component mounted to said circular base adjacent to and peripherally outward of said first recess of said lower housing, each of said first and second half-hinge components having a bore sized to receive a pin that allows pivotal movement therebetween.

19. The filter pad assembly of claim 16, wherein said filter pad contacting means comprises a pair of spaced-apart ribs integral with and extending about the entire periphery of said sealing frame, each of said ribs projecting downward from said sealing frame and terminating in a substantially flat filter pad contact edge.

20. The filter pad assembly of claim 16, wherein said filter pad support screen comprises a structural matrix mounted to said lower housing within said second recess of said lower housing, said matrix being configured to have only minimal contact with said exit side of said filter pad.

21. The filter pad assembly of claim 16, further comprising:
  a base outlet integral with and extending upwardly from said upper surface of said circular base at a location peripherally outward of said first recess of said lower housing, said base outlet being attachable to an adaptor which connects the filter pad assembly to the pumping unit; and
  a channel connecting said outlet aperture of said lower housing to said base outlet.

22. The filter pad assembly of claim 1, wherein the contaminated fluid being filtered is cooking oil.

23. A filter pad assembly used in conjunction with a pumping unit to filter a contaminated fluid, the filter pad assembly supporting a filter pad having an entrance side, an exit side, and a seating cut-out formed therein at a location along its periphery, the filter pad assembly comprising:
  a sealing member having filter pad contacting means and an inlet opening through which the contaminated fluid enters, said filter pad contacting means having a peripheral configuration and dimension substantially matching that of the filter pad;
  a filter pad support member having a seating surface and an inwardly disposed filter pad support screen against which the filter pad is positioned, said seating surface having a peripheral configuration and dimension substantially matching that of the filter pad to ensure that only the exit side of the filter pad may rest against said seating surface, said filter pad support member further having an outlet aperture through which the filtered fluid exits after passing through the filter pad; and
  securing means for maintaining said sealing member and said filter pad support member in a closed operative positon such that said filter pad contacting means of said sealing member compresses the filter pad against said seating surface of said filter pad support member to create a substantially fluid-tight seal, thereby preventing contaminated fluid from exiting said outlet aperture of said filter pad support member without passing through the filter pad.

24. The filter pad assembly of claim 23, wherein:
  said sealing member comprises a sealing frame including said filter pad contacting means and said inlet opening, said sealing frame being positioned along the bottom surface of a reservoir containing the contaminated fluid to be filtered; and
  said filter pad support member comprises an upper housing including said seating surface and said outlet aperture, said upper housing further having a first recess sized to receive the filter pad and an inwardly disposed second recess sized to receive said filter pad support screen, said upper housing being hingedly coupled to said sealing frame such that a chamber is formed when said sealing frame and said upper housing are pivoted to said closed operative position, whereby the contaminated fluid is drawn into the bottom of said chamber through said inlet opening of said sealing frame, through the filter pad, and out the top of said chamber through said outlet aperture of said upper housing by the action of the pumping unit.

25. The filter pad assembly of claim 24, wherein the filter pad is rectangular and the seating cut-out of the filter pad is formed by cropping one corner of the filter pad.

26. The filter pad assembly of claim 23, wherein:
  said filter pad support member comprises a lower housing formed in and extending below the bottom surface of a reservoir containing the contaminated fluid to be filtered, said lower housing including said seating surface and said outlet aperture, said lower housing further having a first recess sized to receive the filter pad and an inwardly disposed second recess sized to receive said filter pad support screen;
  said sealing member comprises a sealing frame including said filter pad contacting means and said inlet opening, said sealing frame and the filter pad being disposed substantially within said first recess of said lower housing when the filter pad assembly is in said closed operative position; and
  said securing means comprises a plurality of spaced-apart latches rotatably mounted to the bottom surface of the reservoir at locations adjacent to and peripherally outward of said first recess of said lower housing, each of said latches having an arm positionable to extend over said first recess to engage said sealing frame,
  whereby the contaminated fluid is drawn into said inlet opening of said sealing frame, through the filter pad, and out said outlet aperture of said lower housing by the action of the pumping unit.

27. The filter pad assembly of claim 26, wherein the filter pad is rectangular and the seating cut-out of the filter pad is formed by cropping one corner of the filter pad.

28. The filter pad assembly of claim 23, wherein:
  said filter pad support member comprises a circular base having a substantially flat upper surface and a dished lower surface, said lower surface being configured to cooperatively mesh with the bottom of a circular, dish-bottomed reservoir containing the contaminated fluid to be filtered so that said upper surface becomes the new bottom surface of the reservoir;
  said circular base further having a lower housing formed in and extending below said upper surface of said circular base, said lower housing including said seating surface and said outlet aperture, said lower housing further having a first recess sized to receive the filter pad and an inwardly disposed second recess sized to receive said filter pad support screen;
  said sealing member comprises a sealing frame hingedly coupled to said upper surface of said circular base, said sealing frame including said filter pad contacting means and said inlet opening, said sealing frame and the filter pad being disposed substantially within said first recess of said lower housing when the filter pad assembly is in said closed operative position; and
  said securing means comprises at least one latch rotatably mounted to said upper surface of said circular base adjacent to and peripherally outward of said first recess of said lower housing, said at least one latch having an arm positionable to extend over said first recess to engage said sealing frame,
  whereby the contaminated fluid is drawn into said inlet opening of said sealing frame, through the filter pad, and out said outlet aperture of said lower housing by the action of the pumping unit.

29. The filter pad assembly of claim 28, wherein the filter pad is rectangular and said seating cut-out of the filter pad is formed by cropping one corner of the filter pad.

30. The filter pad assembly of claim 23, wherein the contaminated fluid being filtered is cooking oil.

* * * * *

UNITED STATES PATENT AND TRADEMARK OFFICE
CERTIFICATE OF CORRECTION

PATENT NO. : 5,143,604
DATED : September 1, 1992
INVENTOR(S) : R.A. Bernard et al.

It is certified that error appears in the above-identified patent and that said Letters Patent is hereby corrected as shown below:

| COLUMN | LINE | |
|---|---|---|
| 3 | 4 | "commerically" should read --commercially-- |
| 6 | 39 | "coupled" should read --couple-- |
| 7 | 9 | "contigous" should read --contiguous-- |
| 17 (Claim 23, Line 24) | 34 (Clam 23, Line 25) | "positon" should read --position-- |

Signed and Sealed this

Seventh Day of September, 1993

*Attest:*

BRUCE LEHMAN

*Attesting Officer*     *Commissioner of Patents and Trademarks*